US009068748B2

(12) United States Patent
Hoke (10) Patent No.: US 9,068,748 B2
(45) Date of Patent: Jun. 30, 2015

(54) AXIAL STAGE COMBUSTOR FOR GAS TURBINE ENGINES

(75) Inventor: James B. Hoke, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 182 days.

(21) Appl. No.: 13/012,212

(22) Filed: Jan. 24, 2011

(65) Prior Publication Data

US 2012/0186262 A1  Jul. 26, 2012

(51) Int. Cl.
*F23R 3/34* (2006.01)
*F23R 3/06* (2006.01)
*F23R 3/50* (2006.01)

(52) U.S. Cl.
CPC . *F23R 3/06* (2013.01); *F23R 3/346* (2013.01); *F23R 3/50* (2013.01); *Y02T 50/675* (2013.01)

(58) Field of Classification Search
CPC .............. F23R 3/002; F23R 3/06; F23R 3/10; F23R 3/28; F23R 3/286; F23R 3/34; F23R 3/346; F02C 7/22; F02C 7/228; F02C 7/236; F02C 7/2365
USPC ............ 60/752, 754, 740, 732–734, 723, 746
See application file for complete search history.

(56) References Cited

U.S. PATENT DOCUMENTS

| 2,268,464 | A | | 12/1941 | Seippel |
| 3,934,409 | A | * | 1/1976 | Quillevere et al. ............... 60/749 |
| 4,260,367 | A | | 4/1981 | Markowski et al. |
| 4,265,615 | A | | 5/1981 | Lohmann et al. |
| 4,420,929 | A | | 12/1983 | Jorgensen et al. |
| 4,787,208 | A | | 11/1988 | DeCorso |
| 4,910,957 | A | * | 3/1990 | Moreno et al. ................... 60/773 |
| 4,984,429 | A | | 1/1991 | Waslo et al. |
| 5,253,474 | A | | 10/1993 | Correa et al. |
| 5,285,631 | A | | 2/1994 | Bechtel, II et al. |
| 5,289,677 | A | | 3/1994 | Jarrell |
| 5,435,139 | A | | 7/1995 | Pidcock et al. |
| 5,490,380 | A | * | 2/1996 | Marshall .......................... 60/776 |
| 5,592,819 | A | | 1/1997 | Ansart et al. |
| 5,628,192 | A | | 5/1997 | Hayes-Bradley et al. |
| 5,640,851 | A | | 6/1997 | Toon et al. |
| 5,687,571 | A | * | 11/1997 | Althaus et al. ................... 60/737 |
| 5,749,219 | A | * | 5/1998 | DuBell ............................ 60/804 |
| 5,758,503 | A | | 6/1998 | DuBell et al. |
| 5,782,294 | A | | 7/1998 | Froemming et al. |

(Continued)

FOREIGN PATENT DOCUMENTS

DE  19631616 A1  2/1998
EP  0544350 A1  6/1993

(Continued)

*Primary Examiner* — Andrew Nguyen
(74) *Attorney, Agent, or Firm* — Miller, Matthias & Hull LLP (57) ABSTRACT

A combustor for a gas turbine engine includes a radially inboard liner, a radially outboard liner, and a bulkhead that cooperatively define an annular combustion chamber, a plurality of first fuel injectors that are disposed in the bulkhead, and a plurality of second fuel injectors that are disposed in at least one of the inboard liner and the outboard liner aftward of the bulkhead. A method is also provided for operating the combustor of the gas turbine engine wherein fuel distribution between the forward combustion zone and the downstream combustion zone is selectively varied in response to the power operating mode of the gas turbine engine with an objective to control NOx formation.

15 Claims, 4 Drawing Sheets

(56) References Cited

U.S. PATENT DOCUMENTS

| | | |
|---|---|---|
| 5,791,148 A | 8/1998 | Burrus |
| 5,797,267 A | 8/1998 | Richards |
| 5,934,067 A | 8/1999 | Ansart et al. |
| 5,983,642 A | 11/1999 | Parker et al. |
| 6,047,539 A | 4/2000 | Farmer |
| 6,070,412 A | 6/2000 | Ansart et al. |
| 6,105,360 A | 8/2000 | Willis |
| 6,182,451 B1 | 2/2001 | Hadder |
| 6,189,814 B1 | 2/2001 | Richards |
| 6,240,731 B1 | 6/2001 | Hoke et al. |
| 6,378,286 B2 | 4/2002 | Vermes et al. |
| 6,470,685 B2 | 10/2002 | Pidcock et al. |
| 6,571,566 B1 | 6/2003 | Temple et al. |
| 6,606,861 B2 | 8/2003 | Snyder |
| 6,701,714 B2 | 3/2004 | Burd et al. |
| 6,763,664 B2 | 7/2004 | Aoyama |
| 6,810,673 B2 | 11/2004 | Snyder |
| 7,007,481 B2 | 3/2006 | McMasters |
| 7,093,439 B2 | 8/2006 | Pacheco-Tougas et al. |
| 7,093,441 B2 | 8/2006 | Burd et al. |
| 2002/0116929 A1 | 8/2002 | Snyder |
| 2002/0148228 A1 | 10/2002 | Kraft et al. |
| 2003/0061817 A1 | 4/2003 | Aoyama |
| 2003/0101731 A1 | 6/2003 | Burd et al. |
| 2003/0167771 A1 | 9/2003 | Hayashi et al. |
| 2003/0213250 A1 | 11/2003 | Pacheco-Tougas et al. |
| 2003/0233832 A1 | 12/2003 | Martling et al. |
| 2004/0006995 A1 | 1/2004 | Snyder |
| 2004/0226299 A1 | 11/2004 | Drnevich |
| 2004/0231333 A1 | 11/2004 | Tiemann |
| 2005/0022531 A1 | 2/2005 | Burd |
| 2005/0086940 A1 | 4/2005 | Coughlan et al. |
| 2005/0086944 A1 | 4/2005 | Cowan |
| 2010/0170254 A1 * | 7/2010 | Venkataraman et al. ....... 60/746 |

FOREIGN PATENT DOCUMENTS

| | | |
|---|---|---|
| EP | 1515090 A1 | 3/2005 |
| EP | 1522792 A1 | 4/2005 |
| EP | 1775516 A2 | 4/2007 |
| FR | 2694799 A1 | 2/1994 |
| GB | 818634 A | 8/1959 |
| GB | 2278431 A | 11/1994 |
| GB | 2384046 A | 7/2003 |
| GB | 2390890 A | 1/2004 |
| JP | 4139312 A | 5/1992 |
| WO | WO-2008127437 A2 | 10/2008 |

\* cited by examiner

AXIAL STAGE COMBUSTOR FOR GAS TURBINE ENGINES

FIELD OF THE INVENTION

This invention relates generally to gas turbine engines and, more particularly, to a combustor for a gas turbine engine and a method for operating a combustor for a gas turbine engine.

BACKGROUND OF THE INVENTION

Gas turbine engines, such as those used to power modern aircraft or in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor.

An exemplary combustor features an annular combustion chamber defined between a radially inboard liner and a radially outboard liner extending aft from a forward bulkhead. The radially outboard liner extends circumferentially about and is radially spaced from the inboard liner, with the combustion chamber extending fore to aft therebetween. Exemplary liners are double-wall structured, having an inner heat shield and an outer support shell. Combustion air admission holes penetrate the outboard liner and the inboard liner to admit combustion air into the combustion chamber along the length of the combustion chamber. A plurality of circumferentially distributed fuel injectors and associated swirlers or air passages is mounted in the forward bulkhead. The fuel injectors project into the forward end of the combustion chamber to supply the fuel. The swirlers impart a swirl to inlet air entering the forward end of the combustion chamber at the bulkhead to provide rapid mixing of the fuel and inlet air. Commonly assigned U.S. Pat. Nos. 6,240,731; 6,606,861; 6,810,673 and 7,093,441, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. The combustion process in a combustor configured for RQL combustion has two governing states of combustion: a first state in the forward portion of the combustor that is stoichiometrically fuel-rich and a second state in a downstream portion of the combustor that is stoichiometrically fuel-lean. In conventional practice, all of the fuel is admitted through the plurality of fuel and air admission assemblies disposed in the bulkhead thereby establishing a forward combustion zone in the combustion chamber. A portion of the combustion air is admitted with the fuel into the forward combustion zone, another portion of combustion air is admitted downstream of the forward combustion zone to rapidly quench and dilute the combustion products, and additional air is admitted to the combustion chamber downstream of the quench zone to further dilute the combustion products.

Conventional annular combustors for aircraft gas turbine engines employing the RQL combustion process typically are more effective in reducing NOx emissions during high power engine operating conditions, such as experienced during take-off and climb, than during low and moderate power engine operating conditions, such as experienced during approach, idle, and cruise. At high power, the forward combustion zone is operated fuel-rich, but at low and moderate power, the forward combustion zone is operated closer to stoichiometric fuel to air ratios. Accordingly, a desire exists for a gas turbine combustor that exhibits effective NOx emission reduction performance over the entire range of engine operating conditions, including cruise.

SUMMARY OF THE INVENTION

A combustor for a gas turbine engine includes a radially inboard liner, a radially outboard liner, and a bulkhead that cooperatively define an annular combustion chamber, a plurality of first fuel injectors that are disposed in the bulkhead, and a plurality of second fuel injectors that are disposed in at least one of the inboard liner and the outboard liner aftward of the bulkhead.

In an embodiment, the radially inboard liner extends circumferentially and fore to aft longitudinally, the radially outboard liner extends circumferentially and fore to aft longitudinally and circumscribing the inboard liner, and the annular bulkhead having circumferential expanse and radial expanse and extending between a forward end of the inboard liner and a forward end of the outboard liner. The plurality of first fuel injectors are arranged in the bulkhead to inject fuel generally longitudinally into a forward combustion zone in a forward region of the combustion chamber and the plurality of second fuel injectors are arranged in the at least one of the inboard liner and the outboard liner to inject fuel generally radially inward, and optionally with a tangential component, into a downstream combustion zone in a downstream region the combustion chamber. The number of the plurality of second fuel injectors is greater than the number of the plurality of first fuel injectors. In an embodiment, the number of the plurality of second fuel injectors may be between two to six times the number of the plurality of first fuel injectors.

In an embodiment, the plurality of second fuel injectors are arranged in the outboard liner. In an embodiment, the second fuel injectors are arranged in a circumferential ring in circumferentially spaced relationship. In an embodiment, the second fuel injectors are arranged in a first circumferential ring and a second circumferential ring disposed in longitudinally spaced relationship, with the second fuel injectors disposed in circumferentially spaced relationship within each of the first and second circumferential rings. The second fuel injectors disposed in the second circumferential ring may be disposed in staggered relationship relative to the second fuel injectors disposed in the first circumferential ring.

In an embodiment, a plurality of first combustion air admission holes penetrate the at least one of the inboard liner and the outboard liner and a plurality of second combustion air admission holes penetrate the at least one of the inboard liner and the outboard liner. The first combustion air admission holes are disposed in a circumferential ring located forward of the plurality of second fuel injectors and the second combustion air admission holes are disposed in a circumferential ring located aft of the plurality of second fuel injectors. A plurality of air admission swirlers are disposed in the bulkhead in operative association with the plurality of first fuel injectors, with each air admission swirler disposed about a respective one of the plurality of first fuel injectors. A plurality of main combustion air admission devices is disposed in operative association with the plurality of second fuel injectors, thereby forming an equal number of main fuel/air admission assemblies.

A method is provided for operating a gas turbine combustor defining a combustion chamber having an aft exit. The method includes the steps of: combusting a first flow of fuel and a first flow of combustion air in a forward region of the combustor thereby establishing a forward combustion zone within the combustion chamber; combusting a second flow of fuel and a second flow of combustion air in the combustor aft of the forward combustion zone thereby establishing a downstream combustion zone within the combustion chamber; and admitting a third flow of combustion air into the combustion chamber into an aft zone downstream of the downstream combustion zone. The method may include the further step of admitting a fourth flow of combustion air into the combustion chamber into an intermediate zone between the forward combustion zone and the downstream combustion zone.

During low power operation of the gas turbine engine, the method may include the step of establishing a fuel-rich combustion environment in the first combustion zone. During cruise and high power operation of the gas turbine engine, the method may include the step of establishing a fuel-lean combustion environment in both the first combustion zone and the second combustion zone. In an embodiment, the method includes the further step of selectively distributing air flow to the combustor as follows: 5% to 15% as the first flow of combustion air admitted into the forward combustion zone; 40% to 65% as the second flow of combustion air admitted into the downstream combustion zone; and 5% to 25% as the third flow of combustion air admitted into the aft zone. The method may further include the step of selectively distributing up to 10% of the air flow to the combustor as the fourth flow of combustion air admitted to the intermediate zone.

A method is disclosed for operating an aircraft gas turbine engine combustor defining a combustion chamber having an aft exit. The method includes the steps of: combusting a first flow of fuel and a first flow of combustion air in a forward region of the combustor thereby establishing a forward combustion zone within the combustion chamber; combusting a second flow of fuel and a second flow of combustion air in the combustor aft of the forward combustion zone thereby establishing a downstream combustion zone within the combustion chamber; and at low power operation of the gas turbine engine, selectively distributing the fuel being supplied to the combustor between the forward combustion zone and the downstream combustion zone with 40% to 100% as the first flow of fuel and with 0% to 60% as the second flow of fuel. During engine idle, the method includes the step of selectively distributing the fuel being supplied to the combustor between the forward combustion zone and the downstream combustion zone with 80% to 100% as the first flow of fuel and with 0% to 20% as the second flow of fuel. During engine approach, the method includes the step of selectively distributing the air being supplied to the combustor between the forward combustion zone and the downstream combustion zone with 40% to 85% as the first flow of fuel and with 15% to 60% as the second flow of fuel.

At higher power operation of the gas turbine engine, the method includes the step of selectively distributing the fuel being supplied to the combustor between the forward combustion zone and the downstream combustion zone with 15% to 25% as the first flow of fuel and with 75% to 85% as the second flow of fuel. Higher power operation of the gas turbine engine includes engine operation at cruise, engine operation at climb, and engine operation at take-off.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
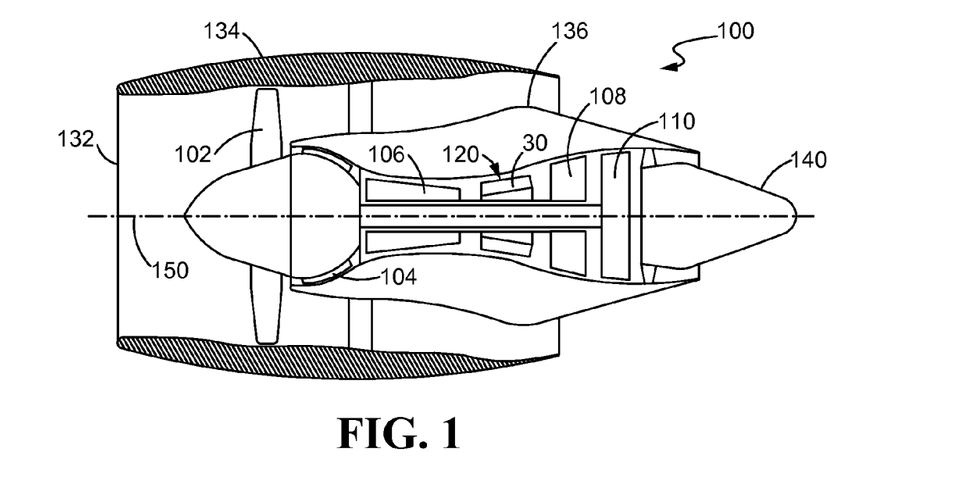
FIG. 1 is a schematic view of a longitudinal section of an exemplary embodiment of a gas turbine engine.

Referring initially to FIG. 1, there is shown an exemplary embodiment of a turbofan gas turbine engine, designated generally as 100, that includes, from fore-to-aft longitudinally about a central engine axis 150, a fan 102, a low pressure compressor 104, a high pressure compressor 106, a combustor module 120, a high pressure turbine 108, and a low pressure turbine 110. A nacelle forms a housing or wrap that surrounds the gas turbine engine 100 to provide an aerodynamic housing about gas turbine engine. In the turbofan gas turbine engine 100 depicted in the drawings, the nacelle includes, from fore to aft, the engine inlet 132, the fan cowl 134, the engine core cowl 136 and the primary exhaust nozzle cone 140. It is to be understood that the combustor as disclosed herein is not limited in application to the depicted embodiment of a gas turbine engine, but is applicable to other types of gas turbine engines, including other types of aircraft gas turbine engines, as well as industrial and power generation gas turbine engines.

Figure 2:
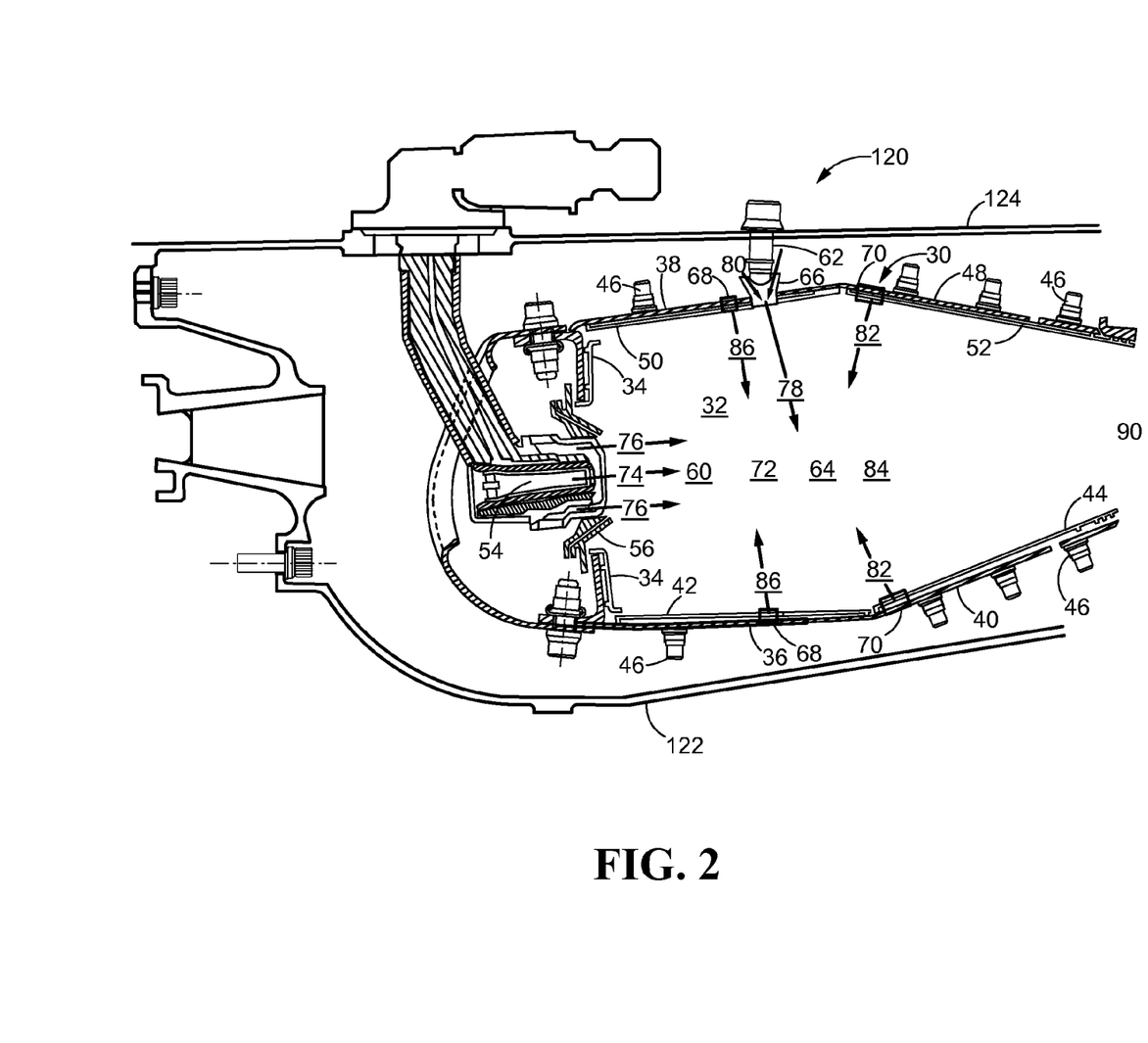
FIG. 2 is a sectioned side elevation view of an exemplary embodiment of the annular combustor disclosed herein.

Referring now to FIG. 2, the combustor module 120 includes an annular combustor 30 disposed concentrically about the engine axis 150 within a pressure vessel defined by a radially inboard case 122 and a radially outboard case 124. A bulkhead 34 is disposed at a forward end of the annular combustion chamber 32 longitudinally opposite a combustor exit 90 at an aft end of the annular combustion chamber 32. The bulkhead 34 has a radial expanse and a circumferential expanse. The combustion chamber 32 of the annular combustor 30 is bounded by a radially inboard liner 36, a radially outboard liner 38, and the forward bulkhead 34 that extends between the respective forward end of the inboard liner 36 and the forward end of the outboard liner 38. The inboard liner 36 and the outboard liner 38 extend circumferentially about the longitudinal axis 150 of the gas turbine engine and extend longitudinally fore-to-aft from the forward bulkhead 34 to the combustor exit. The outboard liner 38 is spaced radially outward from and coaxially about the inboard liner 36 and circumscribes the inboard liner 36.

In the exemplary embodiment depicted in FIG. 2, the inboard liner 36 and the outboard liner 38 have a double-wall structure with a support shell and associated heat shields. The inboard liner 36 comprises a single piece support shell 40 and forward and aft inner heat shields 42, 44 secured by fasteners 46 to respective forward and aft portions of the support shell 40. Similarly, the outboard liner 38 comprises a single piece support shell 48 and forward and aft inner heat shields 50, 52 secured by fasteners 46 to respective forward and aft portions of the support shell 48. The heat shields 42, 44, 50, 52 may be formed as a circumferential array of actuate panels. The inboard and outboard liner 36, 38 may have a plurality of cooling air holes (not shown), including, for example, impingement cooling holes and film cooling holes, penetrating through the support shell and heat shields as in conventional practice. Exemplary liner and heat shield constructions are described and shown in commonly assigned U.S. Pat. No. 7,093,439, the entire disclosure of which is hereby incorporated herein by reference as if set forth herein. Other embodiments, including single-wall liners, are still within the spirit and scope of the invention.

Figure 3:
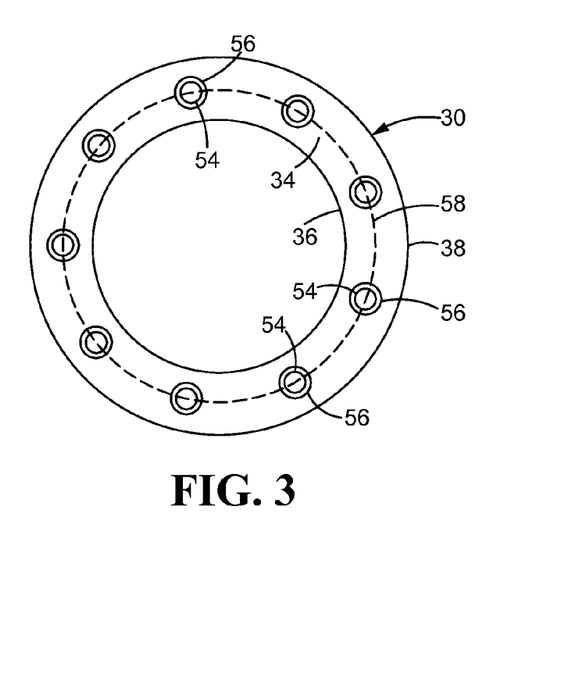
FIG. 3 is an elevation view of the forward bulkhead of the annular combustor looking forward from within the combustion chamber of the annular combustor of FIG. 2.

Referring now also to FIG. 3, a plurality of first fuel injectors 54 and associated air swirler assemblies 56 open to the annular combustion chamber 32 through the bulkhead 34 for injecting fuel generally longitudinally into the annular combustion chamber 32 into a swirling flow of air, thereby establishing a forward combustion zone 60 within the annular combustion chamber 32. The plurality of first fuel injector constitute pilot fuel injectors that are designed, together with the associated air swirler assemblies 56, in a manner well-known in the art, to establish a stable flame. One or more igniters (not shown) may be provided in operative association with the plurality of first fuel injectors 54 for igniting the fuel and air mixture admitted into the forward combustion zone 60. The plurality of first fuel injectors 54 and associated air swirler assemblies 56 may be disposed in a circumferential ring 58 extending about the circumferential expanse of the bulkhead 34 such as illustrated in FIG. 3.

A plurality of second fuel injectors 62 are disposed in at least one of the inboard liner 36 and the outboard liner 38 aftward of the bulkhead 34. Additionally, a plurality of main combustion air admission devices 66 are disposed in operative association with the plurality of second fuel injectors 62 to form an equal number of main fuel/air admission assemblies. Each main fuel/air admission assembly includes one second fuel injector 62 and an associated main combustion air admission device 66 into which the second fuel injector 62 opens, for example as depicted in FIG. 2. Pressurized air from within the pressure vessel defined between the inboard and outboard cases 122, 124 enters each main combustion air admission device 66 to at least partially mix with the fuel discharging from the respective second fuel injector 62 with which the main combustion air admission device 66 is associated. The plurality of second fuel injectors 62, together with their respective associated main combustion air admission devices 66, are arranged in the at least one of the inboard liner 36 and the outboard liner 38 to inject fuel, in a fuel/air mixture, generally radially inward, and optionally with a tangential component, into the combustion chamber 32, thereby establishing a second combustion zone downstream of the forward combustion zone. The main fuel/air admission assemblies formed by the second fuel injectors 62 and associated main combustion air admission devices 66 may each be designed to inject a relatively high momentum stream of fuel/air mixture into the chamber 32 to penetrate the hot combustion gases passing from the forward combustion zone 60 downstream through the combustion chamber to the combustor exit 90. As will be discussed further hereinafter, during high power operation of the gas turbine engine, the downstream combustion zone 64 serves as the primary combustion zone into which a majority of the fuel being supplied to the combustion chamber 32 is injected. To accommodate the higher fuel flow rates associated with high power operation of the gas turbine engine, the number of the plurality of second fuel injectors 62 may be greater than the number of the plurality of first fuel injectors 54. In an embodiment, the number of the plurality of second fuel injectors 62 may be between two to six times the number of the plurality of first fuel injectors 62.

Figure 5:
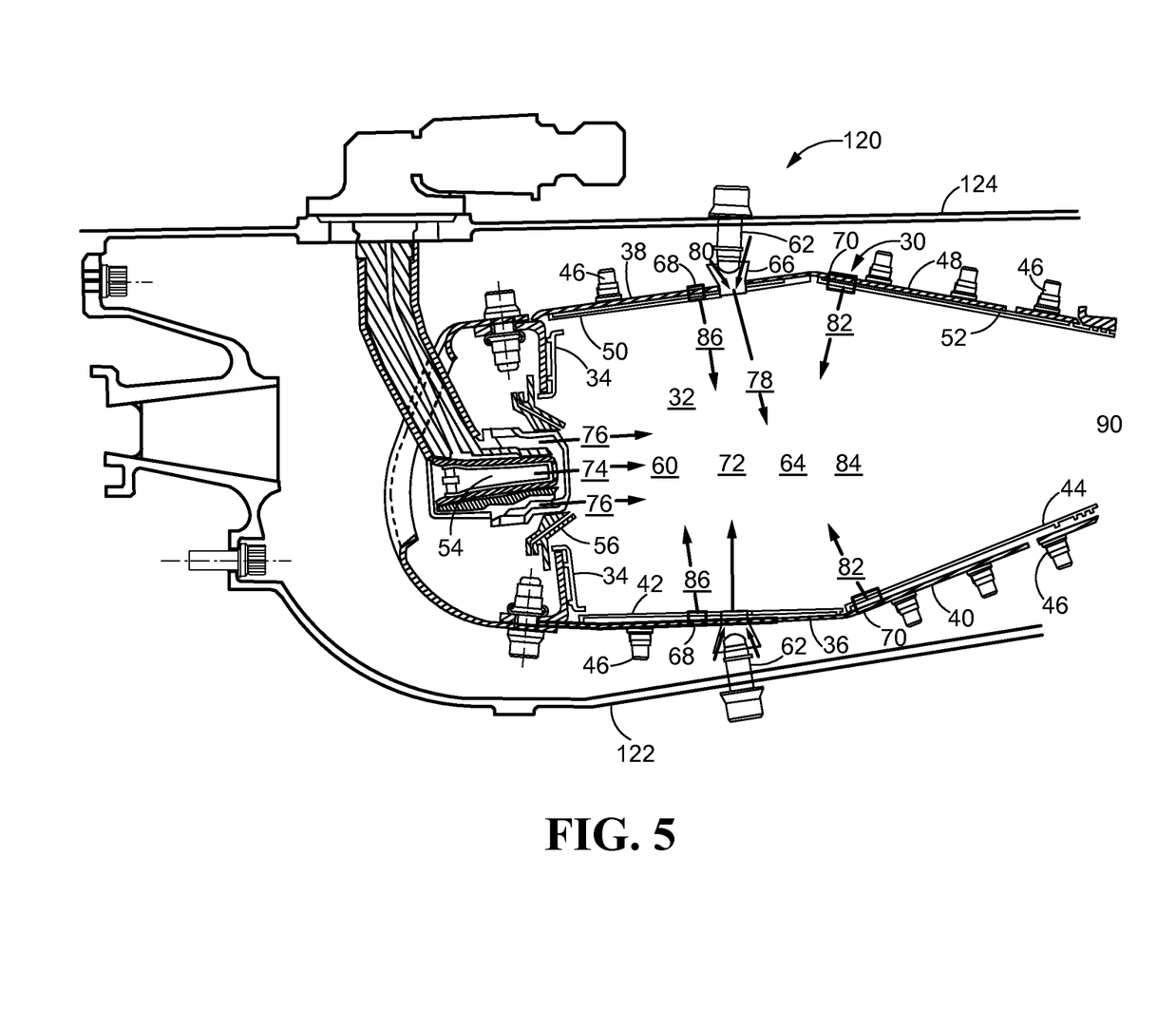
FIG. 5 is a sectional view of an exemplary combustor having staggered injectors.

In the exemplary embodiment of the depicted in FIG. 2, the plurality of second fuel injectors 62 are arranged only in the outboard liner 38. In general, the radially outboard liner 38 is suitable for incorporation of the second fuel injectors 62 since it is feasible to dispose the fuel manifolding for supplying the fuel to the second fuel injectors 62 externally of the radially outboard casing 124. In an embodiment, the second fuel injectors 62 are arranged in a circumferential ring in circumferentially spaced relationship about the circumferential expanse of the radially outboard liner 38. In an embodiment, the second fuel injectors 62 are arranged in a first circumferential ring and a second circumferential ring disposed in a longitudinally spaced relationship, with the second fuel injectors disposed in circumferentially spaced relationship within each of the first and second circumferential rings. The second fuel injectors 62 disposed in the second circumferential ring may be disposed in a staggered relationship relative to the second fuel injectors 62 disposed in the first circumferential ring as shown in FIG. 5.

As noted before, a plurality of air admission swirlers 56 are disposed in the bulkhead 34 in operative association with the plurality of first fuel injectors 54 to form a plurality of pilot fuel/air admission assemblies through which a first flow of fuel and a first flow of combustion air is introduced into the forward region of the combustion chamber 32. For example, each air admission swirler 56 may be disposed about a respective one of the plurality of first fuel injectors 54, as in conventional practice. Additionally, a second flow of fuel and a main flow of combustion air are introduced into the downstream combustion zone 64 through the main fuel/air admission assemblies formed by the plurality of main combustion air admission devices 66 disposed in operative association with the plurality of second fuel injectors 62.

Additionally, a plurality of aft combustion air admission holes 70 is provided which penetrate at least one or both of the inboard liner 36 and the outboard liner 38. The aft combustion air admission holes 70 are disposed in a circumferential ring located aft of the plurality of second fuel injectors 62 and the plurality of main combustion air admission devices 66. A third flow of combustion air enters an aft zone 84 of the combustion chamber 32 downstream of the downstream combustion zone 64. Further, a plurality of intermediate combustion air admission holes 68 may be provided which penetrate at least one of or both of the inboard liner 36 and the outboard liner 38. The intermediate combustion air admission holes 68 are disposed in a circumferential ring located forward of the plurality of second fuel injectors 62 and the plurality of main combustion air admission devices 66 for admitting a fourth flow of combustion air into the combustion chamber 32 into an intermediate zone 72 between the forward combustion zone 60 and the downstream combustion zone 64.

Figure 4:
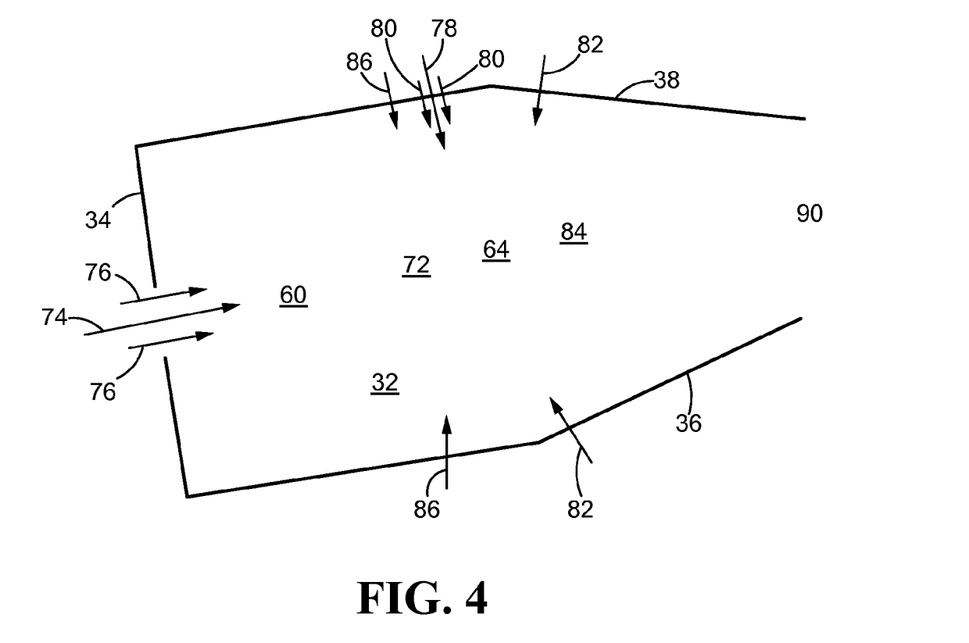
FIG. 4 is a schematic diagram of an exemplary embodiment of the combustor disclosed herein illustrating operation of the combustor in an exemplary mode for controlling NOx formation.

Referring now to FIG. 4 in particular, a method is disclosed herein for operating a gas turbine combustor defining a combustion chamber 32 having an aft exit 90. The method includes the steps of: combusting a first flow of fuel 74 and a first flow of combustion air 76 in a forward region of the combustor thereby establishing a forward combustion zone 60 within the combustion chamber 32, combusting a second flow of fuel 78 and a second flow of combustion air 80 in the combustor aft of the forward combustion zone 60 thereby establishing a downstream combustion zone 64 within the combustion chamber 32, and admitting a third flow of combustion air 82 into the combustion chamber 32 into an aft zone 84 downstream of the downstream combustion zone 64. In an embodiment, the method may include the further step of admitting a fourth flow 86 of combustion air into the combustion chamber into an intermediate zone 72 between the forward combustion zone 60 and the second combustion zone 64.

During low power operation of the gas turbine engine, the method may include the step of establishing a fuel-rich combustion environment in the forward combustion zone 60. During high power operation of the gas turbine engine, the method may include the step of establishing a fuel-lean combustion environment in both the forward combustion zone 60 and the downstream combustion zone 64. The method may include the further step of selectively distributing air flow to the combustor as follows: 5% to 15% as the first flow 76 of combustion air admitted into the forward combustion zone 60; 40% to 65% as the second flow 80 of combustion air admitted into the downstream combustion zone 64; and 5% to 25% as the third flow 82 of combustion air admitted into the aft zone 84. The method may further include the step of selectively distributing up to 10% of the air flow to the combustor as the fourth flow 86 of combustion air admitted to the intermediate zone 72.

The method disclosed herein is particularly suited for controlling NOx emission for application to a combustor of a gas turbine engine powering an aircraft. In an embodiment of the disclosed method for operating an aircraft gas turbine engine combustor defining a combustion chamber 32 having an aft exit 90, the method includes the steps of: combusting a first flow of fuel 74 and a first flow 76 of combustion air in a forward region of the combustor thereby establishing a forward combustion zone 60 within the combustion chamber 32; combusting a second flow 78 of fuel and a second flow 80 of combustion air in the combustor aft of the forward combustion zone 60 thereby establishing a downstream combustion zone 64 within the combustion chamber 32, and at low power operation of the gas turbine engine, selectively distributing the fuel being supplied to the combustor between the forward combustion zone 60 and the downstream combustion zone 64 with 40% to 100% as the first flow 74 of fuel and with 0% to 60% as the second flow 78 of fuel.

During engine idle, the method includes the step of selectively distributing the fuel being supplied to the combustor between the forward combustion zone 60 and the downstream combustion zone 64 with 80% to 100% as the first flow 74 of fuel and with 0% to 20% as the second flow 78 of fuel. During engine approach, the method includes the step of selectively distributing the fuel being supplied to the combustor between the forward combustion zone 60 and the downstream combustion zone 64 with 40% to 85% as the first flow 74 of fuel and with 15% to 60% as the second flow 78 of fuel. At higher power operation of the gas turbine engine, the method includes the step of selectively distributing the fuel being supplied to the combustor between the forward combustion zone 60 and the downstream combustion zone 64 with 15% to 25% as the first flow 74 of fuel and with 75% to 85% as the second flow 78 of fuel. Higher power operation of the gas turbine engine includes engine operation at cruise, engine operation at climb, and engine operation at take-off.

The gas turbine combustor and the method for operating the gas turbine combustor as disclosed herein provide for lower NOx emissions at low, mid and high power operation, and equivalent weight and operability relative to a typical conventional gas turbine combustor. The gas turbine combustor and operation disclosed herein provide facilitate control of NOx formation through shifting of fuel during operation. At low power, such as idle and approach, the forward combustion zone 60, is robustly fueled to establish a fuel-rich combustion environment so that ignition, combustion stability, and low emissions at idle, including emissions of carbon monoxide and unburned hydrocarbons, are achieved. When power increases, e.g. during cruise, climb and take-off, fuel flow to the downstream combustion zone 64, i.e. the main combustion zone, increases and fuel flow to the forward combustion zone 60 decreases whereby both combustion zones operate fuel lean in order to control NOx formation. The increased temperature of the combustion gases from the forward combustion zone 60 flowing across the downstream combustion zone 64, into which the second flow of fuel 78 penetrates, helps to ensure stable combustion in the downstream zone and achievement of high combustion efficiency.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

I claim:

1. A combustor for a gas turbine engine comprising:
   a radially inboard liner extending circumferentially and fore to aft longitudinally;
   a radially outboard liner extending circumferentially and fore to aft longitudinally, the outboard liner disposed radially outward from and circumscribing the inboard liner;
   an annular bulkhead having circumferential expanse and radial expanse and extending between a forward end of the inboard liner and a forward end of the outboard liner, the inboard liner, the outboard liner and the bulkhead cooperatively defining an annular combustion chamber;
   a plurality of first fuel injectors disposed in the bulkhead;
   a forward combustion zone in a forward region of the annular combustion chamber, the forward combustion zone associated with the plurality of first fuel injectors, the forward combustion zone establishing a fuel-rich environment during a low power operation of the gas turbine engine;
   a plurality of second fuel injectors disposed in each of the inboard liner and the outboard liner aftward of the bulkhead, the plurality of second fuel injectors are arranged in first and second circumferential rings, fuel injectors in the second circumferential ring being disposed in staggered relationship relative to fuel injectors in the first circumferential ring, the plurality of second fuel injectors associated with a downstream combustion zone in a downstream region of the annular combustion chamber, both the downstream combustion zone and the forward combustion zone establishing respective fuel-lean environments during a high power operation of the gas turbine engine; and
   a plurality of aft combustion air admission holes penetrating at least one of the inboard liner and the outboard liner, the aft combustion air admission holes disposed in a circumferential ring located aft of the plurality of second fuel injectors.

2. The combustor as recited in claim 1 wherein the plurality of first fuel injectors are arranged in the bulkhead to inject fuel generally longitudinally into the forward combustion zone in the forward region of the combustion chamber and the plurality of second fuel injectors are arranged in each of said inboard liner and outboard liner to inject fuel generally radially inward into the downstream combustion zone in the downstream region of the combustion chamber.

3. The combustor as recited in claim 2 wherein the plurality of second fuel injectors are arranged to inject fuel generally radially with a tangential component.

4. The combustor as recited in claim 1 further comprising: a plurality of intermediate combustion air admission holes penetrating at least one of the inboard liner and the outboard liner, the intermediate combustion air admission holes disposed in a circumferential ring located forward of the plurality of second fuel injectors.

5. The combustor as recited in claim 4 further comprising a plurality of air admission swirlers disposed in the bulkhead in operative association with the plurality of first fuel injectors, each air admission swirler disposed about a respective one of the plurality of first fuel injectors.

6. The combustor as recited in claim 5 further comprising a plurality of main combustion air admission devices disposed in operative association with the plurality of second fuel injectors for admitting a second flow of combustion air in association with a flow of fuel admitted through the plurality of second fuel injectors.

7. The combustor as recited in claim 1 wherein the number of the plurality of second fuel injectors is between two to six times the number of the plurality of first fuel injectors.

8. A gas turbine engine, comprising:
a compressor section;
a turbine section; and
a combustor having
a radially inboard liner extending circumferentially and fore to aft longitudinally,
a radially outboard liner extending circumferentially and fore to aft longitudinally, the outboard liner disposed radially outward from and circumscribing the inboard liner;
an annular bulkhead having circumferential expanse and radial expanse and extending between a forward end of the inboard liner and a forward end of the outboard liner, the inboard liner, the outboard liner and the bulkhead cooperatively defining an annular combustion chamber,
a plurality of first fuel injectors disposed in the bulkhead,
a forward combustion zone in a forward region of the annular combustion chamber, the forward combustion zone associated with the plurality of first fuel injectors, the forward combustion zone establishing a fuel-rich environment during a low power operation of the gas turbine engine,
a plurality of second fuel injectors disposed in each of the inboard liner and the outboard liner aftward of the bulkhead, the plurality of second fuel injectors are arranged in first and second circumferential rings, fuel injectors in the second circumferential ring being disposed in staggered relationship relative to fuel injectors in the first circumferential ring, the plurality of second fuel injectors associated with a downstream combustion zone in a downstream region of the annular combustion chamber, both the downstream combustion zone and the forward combustion zone establishing respective fuel-lean environments during a high power operation of the gas turbine engine,
a plurality of aft combustion air admission holes penetrating at least one of the inboard liner and the outboard liner, the aft combustion air admission holes disposed in a circumferential ring located aft of the plurality of second fuel injectors.

9. The gas turbine engine as recited in claim 8 wherein the plurality of first fuel injectors are arranged in the bulkhead to inject fuel generally longitudinally into the forward combustion zone in the forward region of the combustion chamber and the plurality of second fuel injectors are arranged in each of said inboard liner and outboard liner to inject fuel generally radially inward into the downstream combustion zone in the downstream region of the combustion chamber.

10. The gas turbine engine as recited in claim 9 wherein the plurality of second fuel injectors are arranged to inject fuel generally radially with a tangential component.

11. The gas turbine engine as recited in claim 8 wherein the combustor further has a plurality of intermediate combustion air admission holes penetrating at least one of the inboard liner and the outboard liner, the intermediate combustion air admission holes disposed in a circumferential ring located forward of the plurality of second fuel injectors.

12. The gas turbine engine as recited in claim 11 wherein the combustor further has a plurality of air admission swirlers disposed in the bulkhead in operative association with the plurality of first fuel injectors, each air admission swirler disposed about a respective one of the plurality of first fuel injectors.

13. The gas turbine engine as recited in claim 12 wherein the combustor further has a plurality of main combustion air admission devices disposed in operative association with the plurality of second fuel injectors for admitting a second flow of combustion air in association with a flow of fuel admitted through the plurality of second fuel injectors.

14. The gas turbine engine as recited in claim 8 wherein the second fuel injectors are arranged in a circumferential ring in circumferentially spaced relationship.

15. The gas turbine engine as recited in claim 8 wherein the number of the plurality of second fuel injectors is between two to six times the number of the plurality of first fuel injectors.

* * * * *